United States Patent [19]

Fienup

[11] Patent Number: 4,607,914
[45] Date of Patent: Aug. 26, 1986

[54] OPTICAL SYSTEM DESIGN TECHNIQUES USING HOLOGRAPHIC OPTICAL ELEMENT

[75] Inventor: James R. Fienup, Ann Arbor, Mich.

[73] Assignee: Environmental Research Institute of Michigan, Ann Arbor, Mich.

[21] Appl. No.: 541,267

[22] Filed: Oct. 12, 1983

[51] Int. Cl.⁴ ............................................. G03H 1/08
[52] U.S. Cl. .................................. 350/320; 350/3.66; 350/3.72
[58] Field of Search ...................... 350/3.7, 3.72, 3.73, 350/320, 3.66

[56] References Cited

U.S. PATENT DOCUMENTS 4,138,190 2/1979 Bryngdahl ........................... 350/3.7

Primary Examiner—Bruce Y. Arnold
Attorney, Agent, or Firm—Krass & Young

[57] ABSTRACT

The merit function of an optical system employing a holographic optical element (HOE) is optimized by determining the ideal phase transfer functions of the hologram over a set of field angles and then arriving at the phase transfer function of the hologram by averaging over the ideal phase transfer functions.

2 Claims, 2 Drawing Figures

OPTICAL SYSTEM DESIGN TECHNIQUES USING HOLOGRAPHIC OPTICAL ELEMENT

DESCRIPTION

TECHNICAL FIELD

This invention relates to optical systems and, more particularly, to techniques for optimizing the merit function of optical systems utilizing a holographic optical element (HOE).

BACKGROUND ART

The design optimization of optical systems is conventionally accomplished by iteratively adjusting a number of parameters until the best performance is obtained. These parameters include such things as curvature of the lenses, their refractive indexes, relative spacing between the lenses, etc. When a holographic (diffractive) optical element (HOE) is included in these optical systems, the parameters also consist of the descriptions of the two recording beams, the object and reference beam, used to record the HOE, which descriptions may include, for example, the wavelength of the recording beams and the parameters of the optical systems used to produce the recording beams.

The performance of an optical system is often measured in accordance with relative value of a variable known as a merit function. In the conventional system design approach a certain set of parameters is changed and then the merit function is monitored. If the merit function decreases (0 being the best value) the set of parameters will continue to be changed along the previous direction until adverse results began to occur; then a new direction of parameter changes is investigated. This is effectively a trial and error approach which takes a considerable amount of time. Another problem is that there is no guarantee that any optimization procedure will actually find the optimum values of all the parameters. Still another problem for optical systems utilizing HOE's is that any finite set of parameters cannot describe all possible system variables and therefore an optimum system may not be describable by the parameters employed.

The following papers discuss representative examples of conventional optical system design techniques: D. S. Grey, "Aberration Theories for Semiautomatic Lens Design by Electronic Computers (Parts I and II)", Journal of the Optical Society of America, Volume 53, No. 6, 672 (1963); and R.C. Fairchild and J.R. Fienup, "Computer-Originated Aspheric Holographic Optical Elements", Optical Engineering, Volume 21, No. 1 (1982). An excellent discussion, from a historical standpoint, of various design techniques is found in Feder, "Automatic Optical Design", Applied Optics, Volume 2, No. 12 (1963).

Even with the use of today's high speed computers, the task of quickly and accurately designing an optimum optical system using the various known iterative processes is, at best, a time consuming and arduous task.

The present invention is directed to a technique for quickly and accurately determining the construction of an optical system having the best merit function for any given set of parameters.

SUMMARY OF THE INVENTION

Pursuant to this invention at least one holographic optical element (HOE) is included in the optical system. For a given configuration of the rest of the optical system, both before and after the HOE (but excluding the HOE), one can characterize the wavefronts that would impinge on the HOE and one can characterize the wavefronts that one would ideally wish to exit from the HOE. In accordance with the usual practice in designing optical systems, one can examine the performance of the optical system for a number of different wavefronts incident upon the optical system, for example one wavefront for each of a set of points in an object plane or of points in an image plane, that is to say, for the more general case, for a number of different field angles. Using straight forward analytic techniques, the phase transfer function is calculated for an ideal HOE capable of transforming at one field angle an incident wavefront in the input plane to a given desired wavefront in the output plane. An example of a transformation is, for the case of an imaging system, the transformation of a diverging spherical wavefront from a point in the input plane to a spherical wave converging to a desired point in the output plane. The calculated phase transfer function is then stored in a suitable memory. It is possible to construct an actual HOE that will perfectly transform the incident wavefront at the one field angle to the desired wavefront in the output plane. However, undesirable aberrations will occur if that HOE is used to perform the transformation at other field angles. So instead of using conventional iterative processes to minimize the merit function for the other field angles by adjusting other elements or parameters in the optical system, the phase transfer function for a plurality of other ideal HOE's are calculated for each of the other field angles to be transformed. The phase transfer function of these other ideal HOE's are also stored in the memory. Once the phase transfer function calculations for all of the necessary ideal HOE's has been completed, the actual single HOE that is optimum for the optical system can be constructed. Unexpectedly, it has been determined that the phase transfer function of the actual HOE to be constructed that is optimal over a set of field angles is an average of the phase transfer functions of the ideal HOE's that are optimal for each of the individual field angles. This has been determined to be true for the case in which the merit function is the average of the mean squared or root-mean-squared wavefront deviations. If desired, the phase transfer functions of the individual ideal HOE's may be weighted, as desired, during the averaging process to arrive at an optical system which favors one or more characteristics in the output. Furthermore, the averaging process may include a spatial weighting of each of the phase transfer functions of the ideal HOE's to account for nonuniform illumination of the HOE by the light beams associated with each respective field angle.

The actual HOE may be constructed according to conventional methods including, but not limited to, the use of computer generated hologram techniques.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
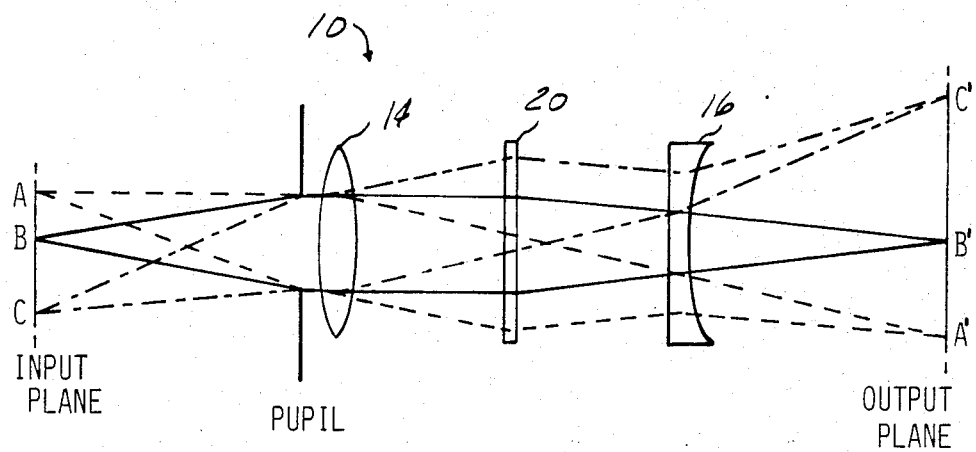
FIG. 1 is a diagrammatic illustration of a simplified optical system which may utilize the teachings of this invention.

FIG. 1 illustrates, in simplified form, an optical system 10 which may benefit from the teachings of the present invention. System 10 may typically include conventional optical elements such as lenses 14 and 16 that together with the HOE 20 perform the desired function. Examples of applications for optical systems that may benefit from the method of the present invention include: imaging systems, Fourier transform optical systems, laser scanning systems, light collection systems, and light distribution systems.

Pursuant to the present invention, a holographic optical element (HOE) 20 is included in the system 10. HOE 20 is formed on any of a wide variety of flat or curved recording media such as emulsions on glass surfaces or films. HOE 20 is advantageously utilized to optimize the performance of optical system 10 in an efficient and accurate manner in conjunction with the other optical elements. As is known in the art, HOE 20 is formed with fringe patterns which operate to diffract incoming light waveforms depending upon the characteristics of the fringe pattern recorded therein. A thin optical element such as an HOE can be characterized by its transmittance function or transfer function:

$$t(x) = |t(x)| e^{j\phi(x)} \qquad \text{Eq. (1)}$$

of which the phase $\phi(x)$ is of primary concern in designing the element in such a way as to reduce aberrations. The phase transfer function of an HOE determines the transformation of an incoming wavefront of a given phase to an output wavefront of a desired phase. For any given field angle, it is possible to compute the ideal phase function for an HOE which will accurately transform an incoming wavefront of phase $\phi_{n,in}(x)$ to a desired output wavefront of phase $\phi_{n,out}(x)$. Said ideal phase of the HOE would be $$\phi_{H,n}(x) = \phi_{n,out}(x) - \phi_{n,in}(x) \qquad \text{Eq. (2)}$$

In FIG. 1 there is shown a set of field angles emanating from three arbitrary points labeled A, B, and C in the input plane. It should be understood that in actual practice there will be many more of these field angles to be considered in designing an optical system but, for ease in explaining the concepts involved in this invention, only three such field angles are shown. It is also understood that for some non-imaging applications a field angle may not be defined by bundles of rays emanating from a point in the input plane, but may instead be defined by a bundle of parallel or non-parallel rays passing through the input plane having a central ray having some position and angle with respect to the input plane. In the example of FIG. 1, it is assumed that it is desired for the optical system to image the rays (or wavefront) associated with the field angle defined by point A in the input plane to point A' in the output plane. Similarly, the rays (or wavefront) associated with the field angles defined by points B and C in the input plane are to be imaged to points B' and C', respectively, in the output plane. The input and output planes can be located in any desirable location within the optical system 10.

Figure 2:
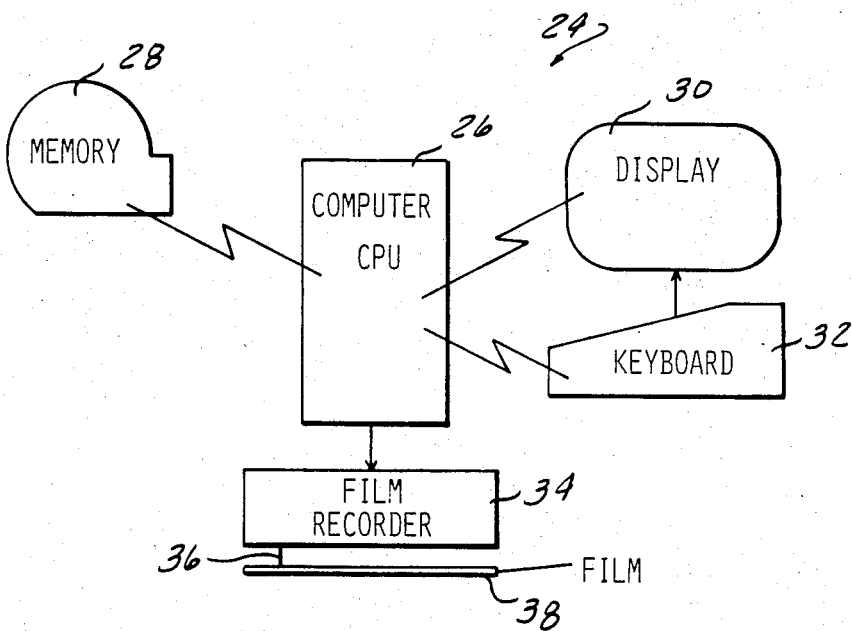
FIG. 2 is a block diagram of a computer system for calculating and generating the HOE.

Pursuant to the present invention, the phase transfer function for an imaginary or idealized HOE is calculated for each of the field angles. The idealized HOE for imaging point A will be referred to as $HOE_A$, while the idealized HOE's for points B and C will be referred to as $HOE_B$ and $HOE_C$, respectively. These idealized phase transfer functions are preferably numerically determined with the aid of a general purpose computer system programmed with a suitable optical system design program. FIG. 2 illustrates a computer system 24 which may advantageously be employed. A central processing unit 26 communicates with input/output devices such as memory 28, display 30, keyboard 32 and film recorder 34. Film recorder 34 includes a laser beam 36 which may be used to record the fringe patterns on a film 38 to effectuate the desired phase transfer function of the HOE 20 in a manner that will be described. Alternatively the HOE may be recorded by another means.

The input phase $\phi_{in}$ for each of the field angles shown in FIG. 1 is calculated by tracing rays for each field angle through the front end of the optical system 10 up to the left side of HOE 20. The output phase $\phi_{out}$ is computed by back tracing rays from the desired point in the output plane through the back end of the optical system 10 to the other side of HOE 20. Ray tracing with the aid of computers is a well known art. Examples of commercially available computer programs for doing lens designing and ray tracing include the known ACCOS software package or Code V from Optical Research Associates.

Once the input phase and the output phase have been defined for a given field angle, then the phase transfer function for the idealized HOE can be computed quite simply for that field angle via Equation 2. In our simplified example, the phase transfer function for $HOE_A$ would be computed by CPU 26 and then stored in memory 28. The phase transfer function for $HOE_B$ would likewise be computed and stored, as would be the phase transfer function for $HOE_C$. Thus, computer system 24 has determined a plurality of phase transfer functions for HOE's that would be optimal for each individual field angle. In other words, the phase transfer function for $HOE_A$ would cause the optical system to accurately image the field angle associated with point A in the input plane to point A' in the output plane. The same is true for the phase transfer functions of $HOE_B$ and $HOE_C$. Unfortunately, none of these phase transfer functions is optimum for the entire set of field angles experienced by the optical system 10. In other words, one HOE can cause the optical system to operate perfectly for any one field angle, but then will have aberrations at all other field angles. The aberrations experienced at the other field angles are generally of such magnitude as to make the choice of any one of the idealized HOE phase transfer functions unacceptable. That is to say that the merit function of the optical system would be too high.

The present invention solves this problem, however, and uses straight forward techniques utilizing the above information to pinpoint the exact phase transfer function of the HOE 20 that will result in the best merit function for the overall optical system. It has been discovered that the phase transfer function of the HOE that is optimum over a set of field angles experienced by the optical system is an average of the previously calculated phase transfer functions of the imaginary ideal HOE's that are optimum for each individual field angle. In this example, this means that the phase transfer function for HOE 20 is an average of the previously calculated phase transfer functions for $HOE_A$, $HOE_B$, and $HOE_C$.

Using the computer system of FIG. 2, CPU 26 would read the phase transfer functions of the imaginary HOE's stored in memory 28 and then perform a straight forward averaging calculation to arrive at the phase transfer function for HOE 20. Film recorder 34 may advantageously then be employed to record the necessary fringe pattern on film 38 to construct HOE 20 providing it with the phase transfer function optimum for the optical system 10. Various other techniques for recording the HOE with this optimum phase transfer function can be used.

Those skilled in the art should now appreciate that the present invention eliminates many of the problems of the conventional trial and error techniques employed in the past by the optical system designer. The present invention replaces the iterative process used in the past with a much more precise and direct method. Various modifications and improvements to the method set forth above will become apparent to the skilled practitioner upon a study of the specification, drawings and claims. For example, it may be desirable to include weighting factors for the phase transfer functions for the ideal HOE's and incorporate these weighting factors into the averaging process for arriving at the final hologram definition. In such manner, the finally generated HOE will more accurately image those points associated with the higher weighting factors.

The above simplified example also assumes that the wavefronts at different field angles all illuminate the same area of the HOE. Provision can be made for those instances in which the wavefronts at each field angle illuminate different and possibly overlapping areas of the optical element. Therefore, while this invention has been described in connection with a particular example thereof, no limitation is intended thereby except as defined in the following claims.

I claim:

1. A method of making an optical system, for which a weighted mean square or root mean squared merit function has been defined, said system having an output plane, said method comprising:

including at least one holographic optical element (HOE) in the system, said HOE being positioned in the system so that is it illuminated from a plurality of field angles and having optimum phase transfer characteristics defined by the steps of:

(a) determining the phase transfer function for a first idealized HOE for transforming a wavefront intersecting the HOE from a first field angle to a first desired wavefront in the output plane of the optical system;

(b) storing the phase transfer function for the first idealized HOE in a memory;

(c) determining the phase transfer function of a plurality of other idealized HOE's for transforming wavefronts from other field angles to other desired wavefronts in the output plane;

(d) storing the phase transfer functions for the other idealized HOE's in the memory;

(e) taking the weighted average of the stored phase transfer functions of the idealized HOEs to generate an optimum phase function for the HOE that will minimize the merit function of the optical system;

(f) forming fringe patterns in a holographic recording material to produce the HOE having the optimum phase tranfer function characteristics; and (g) assembling the optical system including the HOE.

2. The method of claim 1 wherein steps (a) and (c) each include:

determining the input phase of wavefronts from each field angle by tracing rays through the optical system up to one side of the HOE;

determining the output phase associated with each field angle by back tracing rays through the optical system up to an opposite side of the HOE; and calculating the phase transfer function of the idealized HOE's from the input and output phases.

* * * * *